US007257640B1

(12) United States Patent
Callocchia et al.

(10) Patent No.: US 7,257,640 B1
(45) Date of Patent: Aug. 14, 2007

(54) SYSTEM AND METHOD FOR BANDWIDTH MONITORING AND ALLOCATION IN NETWORKS

(75) Inventors: Franco Callocchia, Branchburg, NJ (US); Dominick Gorini, Long Valley, NJ (US)

(73) Assignee: AT&T Corp., New York, NY (US)

( * ) Notice: Subject to any disclaimer, the term of this patent is extended or adjusted under 35 U.S.C. 154(b) by 748 days.

(21) Appl. No.: 10/123,992

(22) Filed: Apr. 16, 2002

(51) Int. Cl.
*G06F 15/16* (2006.01)

(52) U.S. Cl. .................. 709/233; 709/202; 709/224; 709/226; 709/232; 370/468; 370/401; 370/235

(58) Field of Classification Search ........ 709/223–226, 709/232–233, 202–203; 370/230–235, 468, 370/400–401
See application file for complete search history.

(56) References Cited

U.S. PATENT DOCUMENTS

| | | | | |
|---|---|---|---|---|
| 5,964,837 A | * | 10/1999 | Chao et al. | 709/224 |
| 6,292,827 B1 | * | 9/2001 | Raz | 709/217 |
| 6,412,000 B1 | * | 6/2002 | Riddle et al. | 709/224 |
| 6,426,959 B1 | * | 7/2002 | Jacobson et al. | 370/468 |
| 6,636,894 B1 | * | 10/2003 | Short et al. | 709/225 |
| 6,754,230 B2 | * | 6/2004 | Purpura et al. | 370/468 |
| 6,771,596 B1 | * | 8/2004 | Angle et al. | 370/229 |
| 6,771,661 B1 | * | 8/2004 | Chawla et al. | 709/226 |
| 6,847,984 B1 | * | 1/2005 | Midgley et al. | 709/203 |

\* cited by examiner

*Primary Examiner*—Bharat Barot

(57) ABSTRACT

An apparatus that automatically adjusts authorized bandwidth allocated to a user communicating through an Ethernet network. The apparatus includes a usage monitor in communication with a network gateway or network management system to monitor bandwidth consumed by the user, an evaluator responsive to bandwidth usage that automatically determines bandwidth needs based on historical usage or a demand threshold, and a controller responsive to the evaluator to initiate an examination of surplus bandwidth available at various junctions between the user and a destination. The controller may optionally obtain user verification prior to effecting an automatic increase or decrease in allocated or authorized bandwidth. Allocated bandwidth authorization may also be decreased according to network loading and/or a class of service assignment. A corresponding method is also disclosed.

16 Claims, 2 Drawing Sheets

SYSTEM AND METHOD FOR BANDWIDTH MONITORING AND ALLOCATION IN NETWORKS

BACKGROUND

The present invention relates to data communication, but more particularly to a method and an apparatus that provides automatic adjustment of authorized bandwidth of an Ethernet network.

In today's network environment, a subscriber's need for bandwidth or data throughput capacity may vary dramatically from a low level to support such services as email, database access, and news items to a high level to support, for example, video conferencing, streaming audio or video, graphic file transfers, large amounts of data, etc. Ethernet is becoming a growing choice for networking application due to its versatility, installed base of compatible equipment, and cost. Because Ethernet protocols inherently lack bandwidth allocation capability, the front end of such switches have been modified to accommodate metering control of subscriber usage by a network operations center. Metering is usually accomplished manually by personnel at a network operation center, who send a message (typically an IP message) to the front end switch controller. The controller then regulates the amount of bandwidth or throughput based on the subscriber's identification that is embedded within the data packets sent and received by the subscriber's terminal.

When determining a class of service needed to support his or her needs, the subscriber typically estimates peak demand and, based on that estimated demand, subscribes to a class of service level, within desired financial constraints, to meet that demand. The network operation center sets the authorized bandwidth level based on the subscriber's request and bills the subscriber accordingly. This approach often requires the subscriber to pay for more bandwidth than is actually needed.

In a network that includes Ethernet, some service providers have begun to enable subscribers to adjust their bandwidth capacity or maximum data throughput levels by requesting a temporary or permanent increase via a telephone call to a network operations center serving the subscriber or by making the same request via a web site. Because network operations personnel perform adjustments of authorized levels manually, the subscriber typically obtains the requested increase within a couple of hours or the next day after making the request.

SUMMARY OF THE INVENTION

According to one aspect of the invention, there is provided an apparatus that automatically adjusts an amount of bandwidth allocated to an Ethernet-based user communicating with a destination node via a network including an Ethernet network as part of the user's network. The apparatus comprises an access gateway or network management system (NMS), referred to as "access gateway" in this document, interposed between the user and the Ethernet network to regulate the amount of authorized bandwidth allocated to the user, a usage monitor that communicates with the gateway to automatically monitor the amount of bandwidth consumed by the user, an evaluator responsive to the usage monitor to automatically determine bandwidth needed by the user based on historical bandwidth consumption of the user, and a controller responsive to the evaluator to initiate an examination of bandwidth available through at least one junction between the user and the destination node and, in response to the examination, to enable the gateway to alter the authorized bandwidth allocated to the user based on bandwidth availability.

According to another aspect of the invention, there is provided a method of automatically adjusting an amount of bandwidth allocated to an Ethernet-based user communicating with a destination node via a network that includes an Ethernet network. The method includes regulating the amount of authorized bandwidth allocated to the user via an access gateway, monitoring the amount of bandwidth consumed by the user using said gateway to automatically obtain usage information, evaluating the usage information to determine additional bandwidth needed by the user based on historical bandwidth usage, examining bandwidth available at least one junction between the user and a destination node and, in response to said examining, controlling the amount of authorized bandwidth allocated to the user based on bandwidth availability at said junction.

Aspects of the invention include a system and a method in an Ethernet environment for providing adjustments to authorized bandwidth allocated to a user. An access gateway interposed between the user and the Ethernet network regulates the amount of authorized bandwidth allocated to the user. A usage monitor communicates with the gateway to automatically monitor the amount of bandwidth consumed by the user, and an evaluator responsive to the usage monitor automatically determines bandwidth needed by the user. A controller responsive to the evaluator initiates an examination of bandwidth available between the user and a destination node and, in response to the examination, enables the gateway to automatically alter the authorized bandwidth allocated to the user based on bandwidth availability.

Other aspects of the invention will become apparent upon review of the following description of preferred embodiments of the invention, taken in conjunction with the accompanying drawings. The invention, however, is pointed out by the appended claims.

DESCRIPTION OF PREFERRED EMBODIMENTS

Figure 1:
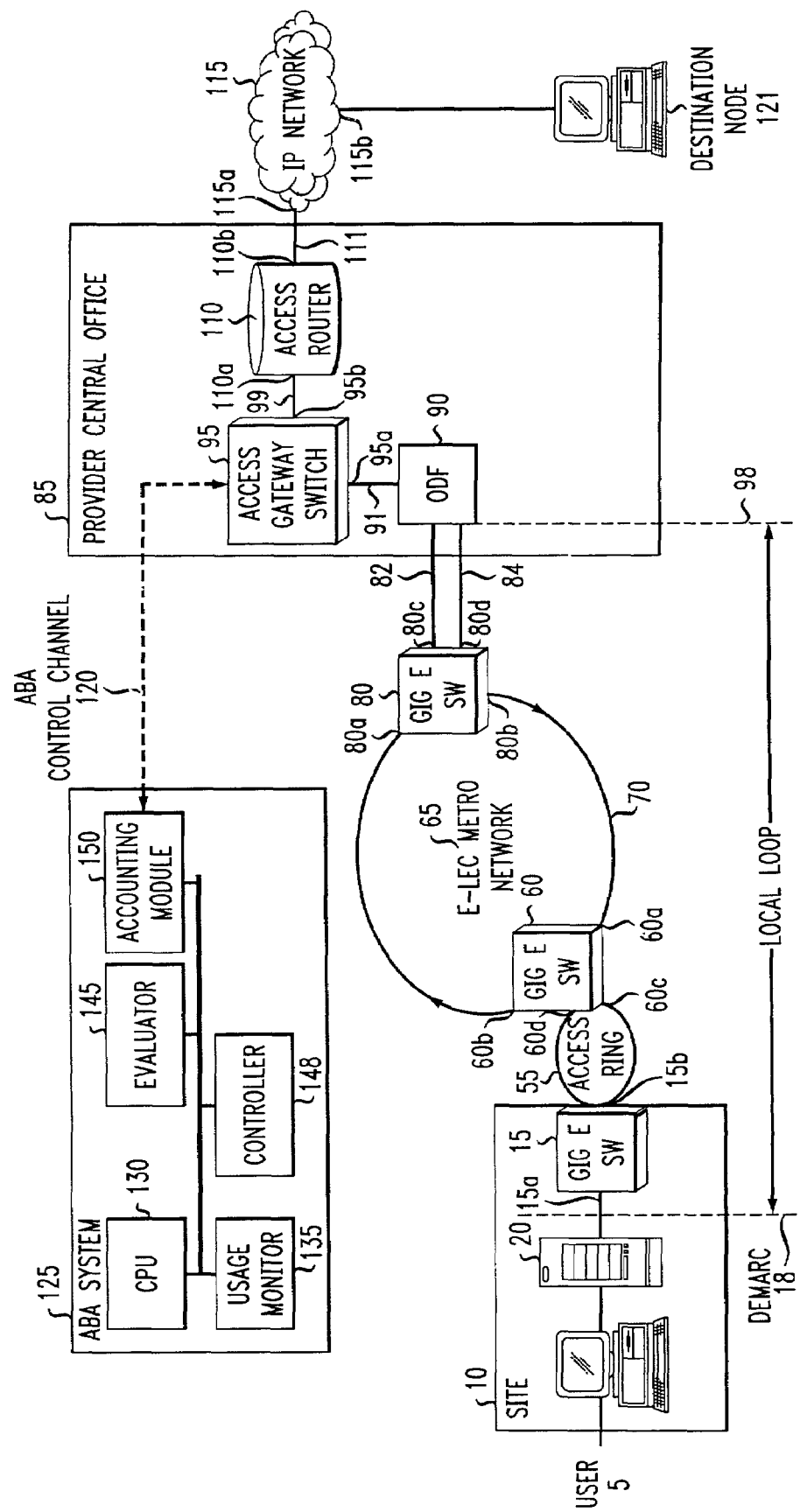
FIG. 1 illustrates an automatic bandwidth allocation system in an Ethernet environment according to one embodiment of the invention.

FIG. 1 shows an embodiment of the automatic bandwidth allocation system (ABA) according to the present invention implemented in a metropolitan area network (MAN) in which Ethernet serves as a primary data transfer protocol.

In FIG. 1, user or subscriber 5 at customer site 10 is connected to MAN 65 provided with Gigabit Ethernet service by an Ethernet local exchange carrier. In addition to being utilized in an Ethernet network, the invention may also be utilized with other high speed digital networks that include SONET, T1, T3, DSL, ISDN, frame relay, ATM, Packet over SONET, and DWDM.

In the illustrated embodiment, apparatus is shown to enable automatic bandwidth allocation to Ethernet-based user 5 for communication with destination node 121 via a network including MAN 65 provided with an Ethernet network and also including central office 85 and IP 115. Ring 70 is a core transport ring able to connect cities or urban concentrations in a large metropolitan area. Ethernet service provisioning switches such as an Extreme Network Alpine 3808 or 3804 switch enabling network management are located on ring 70 and shown as Gigabit (GigE) switches 60 and 80 and at customer site 10 as GigE switch 15. These switches provide a Gigabit Ethernet port to user 5 running at, for example, 10, 100, or 1000 Mbps. They also enable bandwidth to be segmented into dedicated segments—for example, from 500 Kbps to 1 Gbps—and provide monitoring and management of traffic on a customer basis. In another embodiment, such switches may comprise Fast Ethernet or other LAN switches that provide an Ethernet port and enable dedicated bandwidth provisioning and traffic monitoring and management. Such switches are used in existing prior art systems but are implemented for manual provision of bandwidth through web-based and telephone interfaces.

At customer site 10, server 20 resides on the customer side of demarcation 18 and is connected to GigE switch 15, with ingress and egress ports 15a and 15b, residing on the provider side of demarcation 18. Data is transmitted over access ring 55 between GigE switch 15 and GigE switch 60, which has ingress and egress ports 60a and 60b on ring 70 and ingress and egress ports 60c and 60d on access ring 55. Access ring 55 is an Ethernet link but may be, for example, a T1 or T3 line over copper, fiber, cable, or DSL located in the "last mile" of access to customer site 10. In an embodiment for use with legacy apparatus, access gateway switch 95 provides a connection with infrastructure such as SONET, T1, T3, DSL, ISDN, frame relay, ATM, Packet over SONET, and DWDM for aspects of the invention that may be utilized with other high-speed digital networks.

GigE switch 80, with ingress and egress ports 80a and 80b, resides on ring 70, and is linked with provider central office (CO) 85 via ingress port 80c and egress port 80d by ingress line 82 and egress line 84 to optical distribution frame (ODF) 90 residing in CO 85. ODF 90 is linked by line 91 with access gateway switch 95, which is positioned relative to user 5 and Ethernet MAN 65 to regulate authorized bandwidth allocated to user 5. Those skilled in the art will recognize that access gateway switch 95 may also be a network management system or other apparatus that enables access to the Ethernet network within a central office or from any other location.

Figure 2:
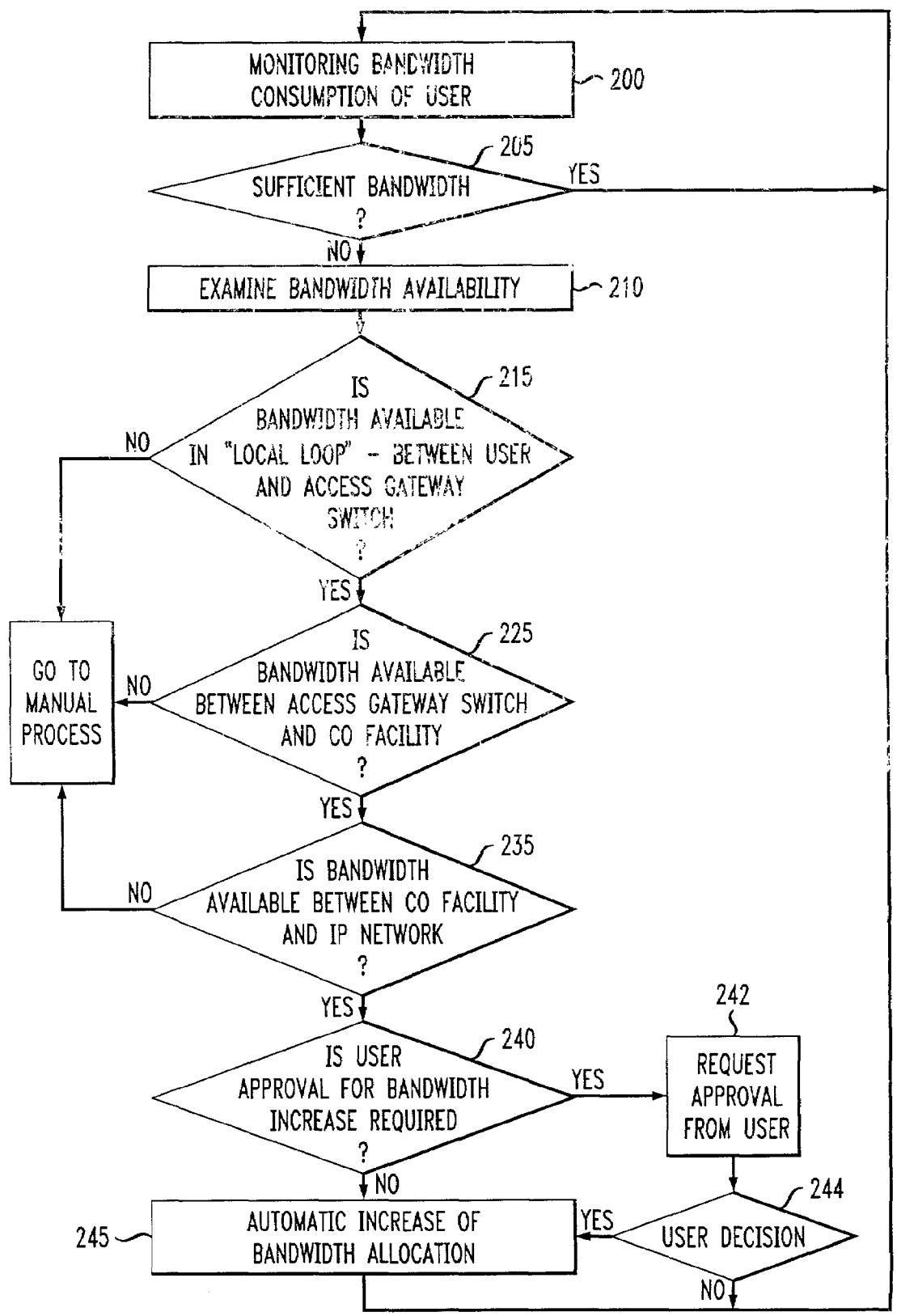
FIG. 2 is a flow chart describing a method for automatic bandwidth allocation in the system illustrated in FIG. 1 according to one embodiment of the invention.

As shown in FIG. 1, apparatus between demarcation 18 and ODF edge 98 is considered within a "local loop" and is referred to as such in the flow chart in FIG. 2. For transmission of data beyond the local loop, access gateway 95 is linked by line 99 to access router (AR) 110. AR 110, with ingress port 110a and egress port 100b, is linked by line 111 to IP network 115, with ports 115a and 115b, which is accessible by destination node 121. Those skilled in the art will recognize that AR 110 and IP 115 are merely exemplary of infrastructure that may be utilized in aspects of the invention.

In the embodiment illustrated in FIG. 1, at least one junction between user 5 and IP network 115 is examined to determine whether subscriber-requested additional throughput can be supported. Such junctions may include GigE switches and corresponding ports, including switches 15 (ingress port 15a and egress port 15b), 60 (ingress ports 60a and 60c and egress ports 60b and 60d), and 80 (ingress ports 80a and 80c and egress ports 80b and 80d), and ingress port 95a and egress port 95b of access gateway switch 95, access router 110, and ingress port 115a and egress port 115b of IP network 115. Based on infrastructure design or known capacity parameters, it may be unnecessary to check certain of these junctions.

Further as to FIG. 1, Automatic Bandwidth Allocation control system (ABA) 125 communicates with Ethernet gateway switch 95 in CO 85 through control channel 120. Alternatively, ABA system 125 or one or more of its components may reside in access gateway switch 95 or within CO 85. In other embodiments, ABA 125 or one or more of its components may reside physically or functionally within any apparatus utilizing a management system enabling the management functions of ABA 125—such as MAN 65 or another high speed data network or switch on MAN 65; CO 85; GigE switch 15 on the provider side of demarcation 18; or server 20 on the customer side of demarcation 18.

As illustrated in the embodiment of FIG. 1, ABA 125 includes a central processing unit (CPU) 130 capable of executing operating software and application software to deploy the components of ABA system 125. ABA system 125 also includes usage monitor 135, which communicates with Ethernet gateway switch 95 through control channel 120 to monitor the amount of bandwidth allocated to user 5. In another embodiment, usage monitor 135 detects and stores usage consumption statistics based on bandwidth consumed by user 5. For example, usage monitor 135 may detect bandwidth usage of user 5 based on specific segments of time, such as yearly, seasonally, monthly, weekly, daily, within a certain number of minutes, etc., or by any subset or combination of any of these periods (for example, Monday mornings of every week from 8 a.m. to 12 a.m., except holidays). Based on this defined demand, bandwidth for specific time periods in the future can be automatically allocated to user 5 without user intervention. For example, bandwidth could be allocated for a teleconference every Monday morning at 9 a.m. for one hour, unless the user indicates otherwise. At 10 a.m. when bandwidth demand has been defined at a lower level, bandwidth can be automatically decreased, thereby limiting the additional costs of user 5 to those incurred for additional bandwidth needed for the teleconference. In another embodiment of the invention, evaluator 145 automatically and continuously calculates new thresholds as usage monitor 135 accumulates usage data.

ABA system 125 further includes evaluator 145, which is responsive to usage monitor 135 to automatically determine the amount of bandwidth needed by user 5 based on historical bandwidth usage. In one embodiment, the determination of evaluator 145 is implemented by use of a mathematically based or statistical algorithm. Other bandwidth prediction algorithms, as known in the art, may be used. In another embodiment, the algorithm determines the need to request additional Ethernet bandwidth based on a threshold level of bandwidth. In other embodiments, the threshold may be established in various ways, including being predefined or automatically calculated as a "new high" threshold based on updated usage data. In another embodiment, evaluator 145 accesses the usage consumption statistics detected and stored by usage monitor 135 in order to determine bandwidth needs of user 5. In yet another embodiment, evaluator 145 determines bandwidth need based on average throughput of user 5.

ABA 125 also includes a controller 148 responsive to the evaluator to initiate an examination of bandwidth available at one or more of the above-mentioned junctions between user 5 and destination node 121. In the embodiment where evaluator 145 determines bandwidth need based on average throughput of user 5, controller 148 initiates the examination of available bandwidth when the average throughput exceeds a given threshold. With reference to FIG. 1, the controller 148 examines the network used for communication between user 5 and destination node 121 for available bandwidth at switches and ports of at least one junction between each of the following: (a) user 5 and access gateway switch 95, (b) gateway switch 95 and CO 85, and (c) CO 85 and IP network 115. Depending on detected bandwidth capacity and other network traffic, an examination by controller 148 may be terminated when it confirms the availability or unavailability of the subscriber-requested additional bandwidth to reach a destination node. Controller 148 will otherwise examine all junctions necessary to confirm that sufficient bandwidth is available. For example, according to the embodiment of the invention illustrated in FIG. 1 and with reference to the flow chart in FIG. 2, controller 148 initiates an examination through access of any one of the switches on the local loop enabled for network management on the "local loop" for available bandwidth capacity. For example, regarding available bandwidth capacity on the local loop, controller 148 examines GigE switch 60 and egress port 60d off the local loop at access ring 55, and then examines GigE switch 80 and egress port 80b. Examination at these two points determines bandwidth availability between user 5 and gateway switch 95. For determining bandwidth availability between gateway switch 95 and CO 85, controller 148 examines ingress port 95a and gateway switch 95. For bandwidth availability between CO 85 and IP network 115, controller 148 examines access router 110 and egress port 110b to IP network 115.

In response to examination, controller 148 enables access gateway switch 95 to alter the authorized bandwidth allocated to user 5 based on bandwidth availability. Where additional bandwidth is needed, controller 148 enables gateway switch 95 to increase the authorized bandwidth of user 5. In another embodiment of the invention, where less bandwidth is needed by user 5, controller 148 enables gateway switch 95 to reduce the authorized bandwidth of user 5 based on a network loading and/or the subscriber's assigned class of service. In another embodiment, evaluator 145 determines that bandwidth available to user 5 can be reduced in times of reduced network usage and signals controller 148 to effect the reduction automatically—for example, in the embodiment according to FIG. 1, bandwidth is automatically reduced after the transmission of data over IP 115 is completed and bandwidth demand of user 5 has returned to a base level. In yet another embodiment of the invention, before altering bandwidth authorization of bandwidth allocation, controller 148 effects communication with user 5 to obtain approval. In another embodiment of the invention, accounting module 150 is responsive to gateway switch 95 to assess charges based on the level of authorized bandwidth allocated to user 5. Thus, for the user's cost control purposes, automatic bandwidth allocation according to the invention allows the user to pay for bandwidth only as used and to reduce bandwidth allocation to a less expensive, base level for other purposes. For an Ethernet service provider, automatic bandwidth allocation according to the invention allows a provider to rationalize bandwidth provisioning according to actual customer usage so that unallocated bandwidth is available for allocation to customers with immediate bandwidth demand.

FIG. 2 is a flow chart of an embodiment of a method of the invention providing instantaneous automatic bandwidth allocation (ABA) with reference to the embodiment of the ABA system illustrated in FIG. 1. At step 200, usage monitor 135 in ABA 125 automatically monitors the bandwidth consumption of user 5 and stores a record of consumption data. User intervention is not required for monitoring bandwidth consumption. In one embodiment, usage monitor 135 automatically detects and stores bandwidth consumption statistics based on bandwidth usage of user 5 based on specific segments of time. At step 205, evaluator 145 utilizes a mathematical algorithm to determine the bandwidth needed by user 5 based on historical bandwidth consumption of user 5. The need may be based on, for example, a predefined stored threshold or an automatically calculated "new high" threshold. If bandwidth is determined to be sufficient at step 205, evaluator 145 signals usage monitor 135 to continue monitoring automatically. If bandwidth is determined to be insufficient at step 205, evaluator 145 signals controller 148 to automatically begin examination of one or more junctions throughout the network from user 5 to destination node 121 to determine the availability of bandwidth that can be allocated for use by user 5 by access gateway switch 95 (step 210).

Usage monitor 148 examines GigE switches 15 to determine whether bandwidth is available in loop 70 (step 215), and then examines GigE switch 60 at port 60b for bandwidth availability at the point of egress of MAN 65 and GigE switch 80 at port 80c at the point of ingress to MAN 65—that is, the availability of bandwidth on the local loop from demarc 18 to access gateway switch 95. If the answer at step 215 is negative, in one embodiment controller 148 can repeat the query to confirm availability as bandwidth is released elsewhere in the network. If the answer is still negative, then user 5 can be notified to manually request additional bandwidth at any desired time. If the answer at step 215 is affirmative, controller 148 examines access port 95a of the gateway switch 95 to determine whether there is bandwidth available (step 225), which determines if bandwidth is in demand elsewhere in the CO. A negative answer is treated as above in step 215.

If the answer at step 225 is affirmative, controller 148 may subsequently examine the port of ingress 115a at IP network 115 for available bandwidth from gateway switch 95 to determine available bandwidth from CO 85 to the IP network. A negative result is treated as above in step 215. If the result at step 225 is positive, then control module 148 effects gateway switch 95 to automatically and instantaneously allocate additional bandwidth for continuous throughput of data with destination node 121. In one embodiment, prior approval of bandwidth change can be required of user 5. In step 240, controller 148 inquires whether user approval is required. If the result is negative, controller immediately effects gateway switch 95 to authorize a change in real time, without the intervention of user 5, in bandwidth allocated to user 5. If the result at step 240 is positive, controller 148 requests approval from user 5 (step 242). A positive result at step 244 by user 5 is followed immediately by an automatic increase in authorized bandwidth allocated to user 5. If user 5 refuses approval at step 244 or a time-out period expires after requesting user approval, the system jumps back to monitoring at step 200. The steps of the method of the embodiment of the invention illustrated by the flow chart of FIG. 2 take place without user intervention except in an embodiment where the user requests prior approval for steps 240 and 245.

The above description sets forth certain embodiments of the system and method of the invention. Those of ordinary skill in the art will appreciate that other embodiments according to the invention may be made for regulating authorized bandwidth allocation by automatic monitoring of usage, evaluation of needed bandwidth, examination for available bandwidth on a network, and immediate change (increase or decrease) in bandwidth allocation bandwidth as needed, and that various modifications to the invention can be made within the spirit and scope of the invention, as defined by the appended claims.

We claim:

1. An apparatus that automatically adjusts an amount of bandwidth allocated to an Ethernet-based user communicating with a destination node via a network including an Ethernet network, said apparatus comprising:

an access gateway interposed between the user and the Ethernet network to regulate the amount of authorized bandwidth allocated to the user, a usage monitor that communicates with the access gateway to automatically monitor the amount of bandwidth consumed by the user, an evaluator responsive to the usage monitor to automatically determine bandwidth needed by the user based on historical bandwidth consumption of the user, and a controller responsive to the evaluator to initiate an examination of bandwidth available through at least one junction between the user and the destination node and, in response to the examination, to enable the access gateway to alter the authorized bandwidth allocated to the user based on bandwidth availability.

2. The apparatus of claim 1, wherein the controller enables the access gateway to increase the authorized bandwidth of the user based on availability of bandwidth at junctions between the user and the destination node.

3. The apparatus of claim 1, wherein the controller enables the access gateway to decrease the authorized bandwidth allocated to the user based on a network loading and class of service assigned to the user.

4. The apparatus of claim 2, wherein the usage monitor detects and stores bandwidth consumption statistics relative to the user, and the evaluator accesses the consumption statistics in order to determine additional bandwidth needed by the user.

5. The apparatus of claim 4, wherein the evaluator determines additional bandwidth need based on average throughput of the user, and the controller initiates the examination when the average throughput exceeds a given threshold.

6. The apparatus of claim 5, further including an accounting module responsive to the access gateway to assess charges based on the level of authorized bandwidth allocated to the user.

7. The apparatus of claim 4, wherein the network further includes a central office and at least one of an IP network, frame relay, ATM, and/or other data networks interposed between the user and the destination node, and the controller examines available bandwidth at least one junction between (a) the user and a gateway switch at the access gateway, (b) the gateway switch and the central office, and (c) the central office and IP network prior to enabling said access gateway to alter the authorized bandwidth allocated to the user based on bandwidth availability.

8. The apparatus of claim 7, wherein the controller effects communication with the user to obtain approval prior to altering bandwidth authorization.

9. A method of automatically adjusting an amount of bandwidth allocated to an Ethernet-based user communicating with a destination node via a network that includes an Ethernet network and an access gateway interposed between the user and the Ethernet network, said method comprising:

regulating the amount of authorized bandwidth allocated to the user via said access gateway, monitoring the amount of bandwidth consumed by the user using said access gateway to automatically obtain usage information, evaluating the usage information to determine additional bandwidth needed by the user based on historical bandwidth usage by the user, examining bandwidth available at least one junction between the user and a destination node and, in response to said examining, controlling the amount of authorized bandwidth allocated to the user based on bandwidth availability at said junction.

10. The method of claim 9, further including increasing the authorized bandwidth of the user based on availability of bandwidth at said junction between the user and the destination node.

11. The method of claim 9, further including decreasing the amount of authorized bandwidth allocated to the user based on network loading and class of service assigned to the user.

12. The method of claim 10, further including detecting and storing bandwidth consumption statistics relative to the user, and wherein said evaluating step includes accessing the consumption statistics in order to determine additional bandwidth need by the user.

13. The method of claim 12, further including determining additional bandwidth need based on average throughput of the user, and wherein said controller initiates said examination when the average throughput exceeds a given threshold.

14. The method of claim 13, further including assessing user charges based on the level of authorized bandwidth allocated to the user.

15. The method of claim 13, wherein the network further includes a central office and at least one of an IP network, frame relay, ATM, and/or other data networks interposed between the user and the destination node, and said examining step further includes examining available bandwidth through at least one junction between (a) the user and an access gateway switch, (b) the access gateway switch and the central office, and (c) the central office and, as one example, an IP network prior to enabling said access gateway to alter the authorized bandwidth allocated to the user based on bandwidth availability.

16. The method of claim 15, further including communicating with the user to obtain authorization prior to altering bandwidth allocation.

* * * * *